Sept. 19, 1950 W. H. STITELER 2,522,693
FERTILIZER SPREADER MACHINE
Filed Nov. 19, 1946 4 Sheets-Sheet 2
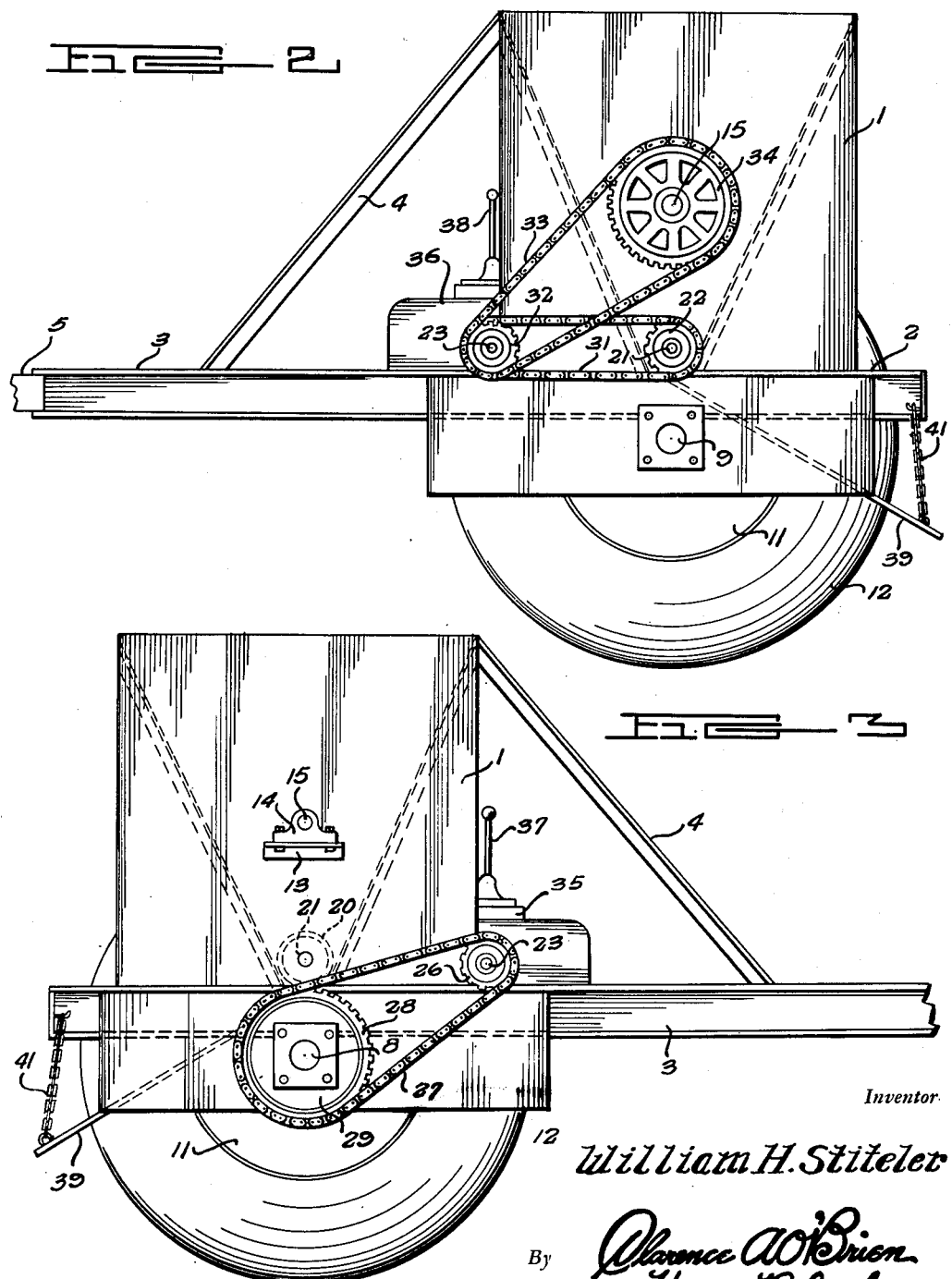

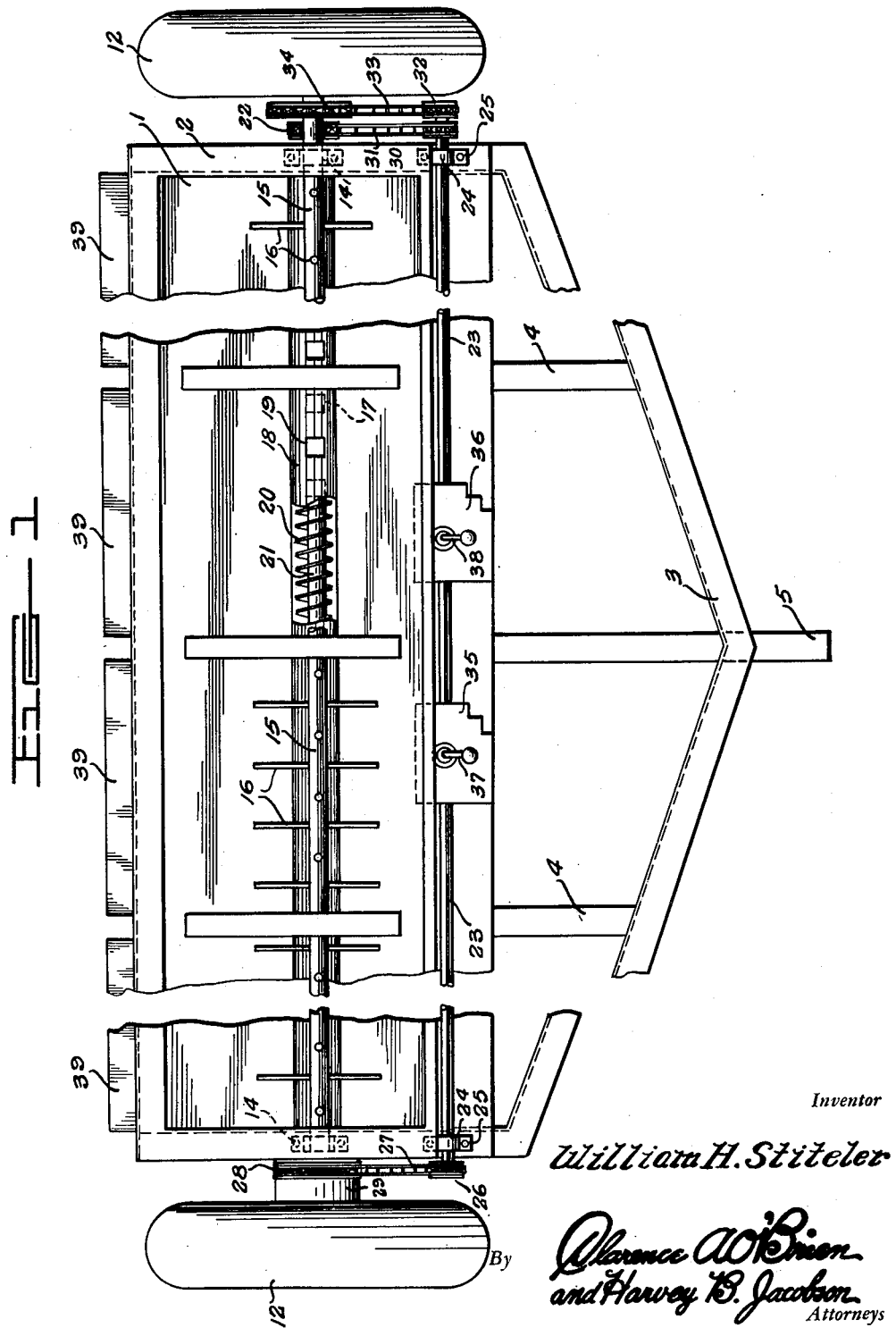

Sept. 19, 1950 W. H. STITELER 2,522,693
FERTILIZER SPREADER MACHINE
Filed Nov. 19, 1946 4 Sheets-Sheet 3
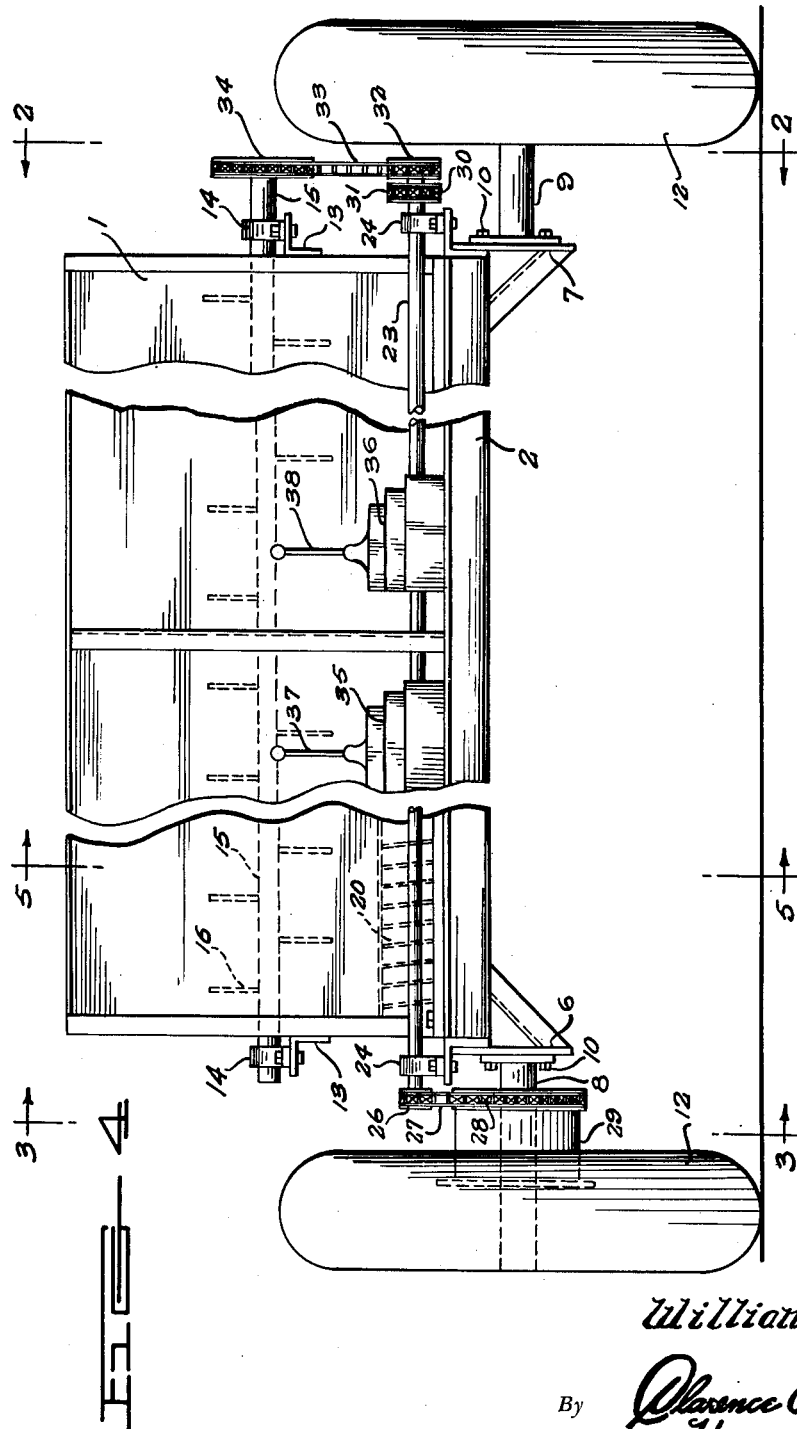
Inventor
William H. Stiteler
By Clarence A. O'Brien
and Harvey B. Jacobson
Attorneys Sept. 19, 1950    W. H. STITELER    2,522,693
FERTILIZER SPREADER MACHINE
Filed Nov. 19, 1946    4 Sheets-Sheet 4
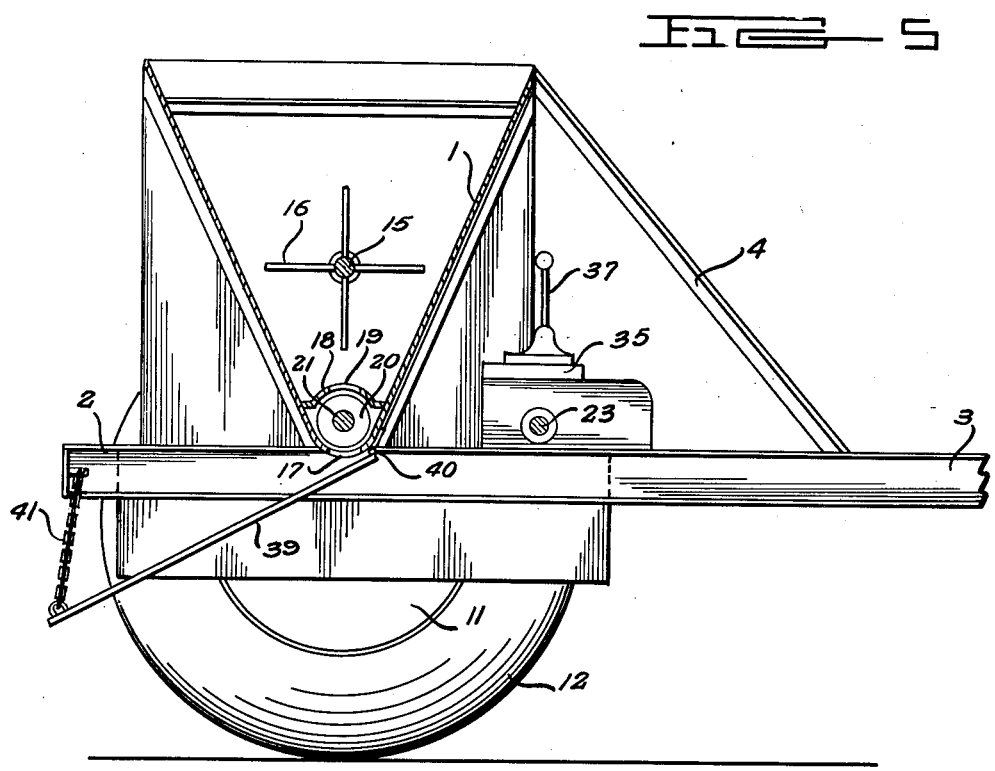
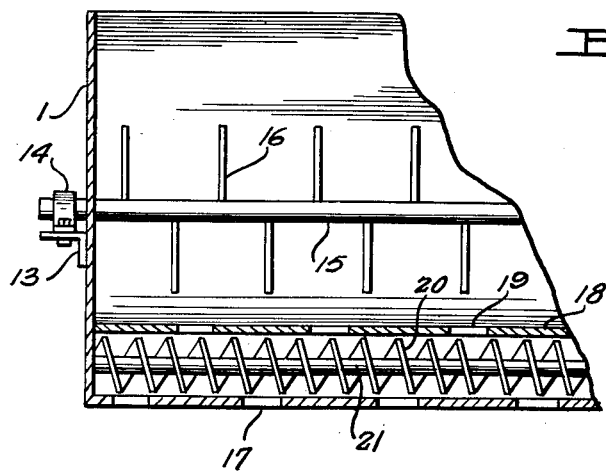
Inventor
William H. Stiteler
By Clarence A. O'Brien
and Harvey B. Jacobson
Attorneys Patented Sept. 19, 1950

2,522,693

UNITED STATES PATENT OFFICE 2,522,693

FERTILIZER SPREADER MACHINE

William H. Stiteler, Brawley, Calif.

Application November 19, 1946, Serial No. 710,793

1 Claim. (Cl. 275—2)

This invention relates to improvements in fertilizer spreading machines.

An object of the invention is to provide an improved fertilizer spreading machine which will be wheel supported, and provided with means for conveying the fertilizer to a plurality of discharge openings along the bottom of the machine for evenly discharging and distributing or spreading the fertilizer as the machine is pulled over a field.

Another object of the invention is to provide an improved wheel supported fertilizer distributing and spreading machine which will include a hopper body having a plurality of spaced fertilizer discharge openings along its lower portion or bottom, together with a power driven agitator member and screw conveyor having interconnected transmission mechanisms whereby the agitating and conveyor mechanisms in the machine may be manually controlled and operated at the desired rate of speed.

A further object of the invention is to provide an improved wheel supported fertilizer spreading and distributing machine which will be highly efficient in operation, and relatively inexpensive to manufacture and produce.

Other objects will appear as the description proceeds.

In the accompanying drawings which form a part of this application,

Figure 1 is a plan view of the improved fertilizer spreading machine;

Figure 2 is an end view taken on the line 2—2 of Figure 4;

Figure 3 is an end view taken on the line 3—3 of Figure 4;

Figure 4 is a front elevation of the improved fertilizer spreading machine with portions thereof being shown in dotted lines;

Figure 5 is a sectional view taken on the line 5—5 of Figure 4, and

Figure 6 is a detail sectional view of one end of the hopper body showing the agitator and fertilizer discharge screw conveyor in position therein.

Like characters of reference are used throughout the following specification and the accompanying drawings to designate corresponding parts.

In carrying out the invention, there is provided an improved fertilizer distributing and spreading machine having a transversely extending hopper body generally denoted by the reference numeral 1, the same being substantially triangular or V-shape in cross section.

The body 1 is supported upon a rectangular frame 2 which is preferably formed of angle iron construction, said frame including forwardly and inwardly extending bracing members 3, intermediate forwardly extending connecting braces 4, and a centrally disposed forwardly extending tongue 5, which may be connected with any suitable tractor (not shown) or other motive means for hauling the fertilizer spreader machine over the fields to be fertilized.

Depending angle iron brackets 6 and 7 are secured to the opposite ends of the main supporting frame 2, and support the laterally extending stub shafts or axles 8 and 9, respectively, the same being secured by the bolts 10.

Supporting wheels 11 having rubber tires 12 are rotatably mounted upon the axles 8 and 9 for supporting the fertilizer spreading machine and for moving the same over the ground.

Angle brackets 13 are attached to the opposite ends of the hopper body 1, and support the bearings 14 between which the agitator shaft 15 is mounted for rotation. Agitator fingers 16 are carried by the shaft 15 and extend outwardly and radially therefrom, as clearly illustrated in the several figures of the drawings.

A plurality of spaced fertilizer discharge openings 17 are formed through the bottom of the hopper body 1, and a transversely extending arcuate plate 18 is disposed between the front and rear walls of said hopper body 1 in spaced relation above the bottom thereof, to form a screw conveyor housing, said plate 18 being provided with a plurality of spaced offset or disaligned openings 19 through which the fertilizer will pass from the hopper body into the screw conveyor housing. A screw conveyor 20 is provided with a shaft 21 which extends the full length of the housing and beyond the opposite ends of the same, and is rotatably mounted between the opposite ends of the main frame 2 and supports a driving sprocket 22 on one end thereof.

The drive shaft 23 is mounted so as to extend lengthwise and forwardly of the hopper body 1 in the bearings 24 secured by the bolts 25 to the opposite ends of the main frame 2, and has a sprocket 26 secured to one end thereof, the same being connected by the chain 27 with the driving sprocket 28 fixed to the hub 29 of the wheel mounted upon the axle 8 for driving the agitator shaft 15 and screw conveyor shaft 21.

A sprocket 30 is secured to the opposite end of the drive shaft 23 and is connected by the sprocket chain 31 with the driving sprocket 22 on the screw conveyor shaft 21.

An outer sprocket 32 is secured to the outer end of the drive shaft 23 adjacent the sprocket 30, and is connected by the sprocket chain 33 with the large sprocket 34 on the end of the agitator shaft 15, whereby rotation of the drive shaft 23 will cause the rotation of said agitator shaft 15 and screw conveyor shaft 21.

A pair of shiftable gear transmissions 35 and 36 will be operatively connected with the drive shaft 23, and will be provided with the operating shift levers 37 and 38 respectively, whereby varying operating speeds of the agitator shaft and conveyor shaft may be secured.

A plurality of fertilizer spreader and distributing boards 39 will be hinged at 40 below the discharge openings 17 in the bottom of the hopper body 1 to extend rearwardly and downwardly therefrom, and will be adjustably supported at their outer ends by means of the chains 41 secured thereto and to the main frame 2.

From the foregoing description, it will be apparent that there has been devised and provided a highly efficient form of fertilizer spreading machine which will be manually controllable to retard or step-up the amount of fertilizer being distributed to secure either light or heavy fertilization of the soil, or any degree of fertilization between the minimum and maximum limits of the machine.

While the preferred embodiment of the instant invention has been illustrated and described, it will be understood that it is not intended to limit the scope of the invention thereto, as many minor changes in detail of construction may be resorted to without departure from the spirit of the invention.

Having thus described my invention, what I claim as new and desire to secure by Letters Patent of the United States is:

A material spreading machine comprising a frame, a wheel at each end of said frame, a hopper extending longitudinally of said frame and having an upwardly curved bottom with a plurality of longitudinally spaced discharge openings therein, an arcuate plate extending longitudinally within said hopper above said bottom with the concave surface facing downwardly and cooperating with said curved bottom to form a generally tubular conveyor housing, a conveyor screw rotatably positioned in said housing, a plurality of longitudinally spaced openings in said plate for entry of material from said hopper into said housing, all of said openings in said plate being in longitudinally staggered relation to said discharge openings in the curved bottom of said hopper in such manner that the blades of said conveyor screw prevent free flow of material between such openings while said conveyor screw is stationary whereby the rate of discharge of material is metered in accordance with the rate of rotation of said conveyor screw, a shaft extending longitudinally of said frame, a driving connection from one of said wheels to said shaft, a selective speed power transmission attached to said shaft, and a driving connection from said transmission to said conveyor screw whereby the rate of rotation of said conveyor screw and the consequent metered rate of discharge of material may be selected by said selective speed power transmission.

WILLIAM H. STITELER.

REFERENCES CITED

The following references are of record in the file of this patent:

UNITED STATES PATENTS

| Number | Name | Date |
|---|---|---|
| 897,829 | Harper | Sept. 1, 1908 |
| 1,095,383 | Cole | May 5, 1914 |
| 1,644,575 | Fitz Gerald | Oct. 4, 1927 |
| 1,994,672 | Smith | Mar. 19, 1935 |
| 2,180,253 | Moore | Nov. 14, 1939 |
| 2,369,755 | Rooselot | Feb. 20, 1945 |
| 2,416,898 | Breeze | Mar. 4, 1947 |

FOREIGN PATENTS

| Number | Country | Date |
|---|---|---|
| 7,770 | Great Britain | May 9, 1889 |
| 24,540 | Australia | Sept. 20, 1935 |